United States Patent [19]
Bochis et al.

[11] 3,928,372

[45] Dec. 23, 1975

[54] 2-(3-OXYTHIAZOLYL)BENZIMIDAZOLES

[75] Inventors: Richard J. Bochis, East Brunswick; Michael H. Fisher, Somerville, both of N.J.

[73] Assignee: Merck & Co., Inc., Rahway, N.J.

[22] Filed: Aug. 31, 1973

[21] Appl. No.: 393,515

Related U.S. Application Data

[63] Continuation of Ser. No. 224,357, Feb. 7, 1972, abandoned, which is a continuation of Ser. No. 20,092, March 16, 1970, abandoned, which is a continuation of Ser. No. 775,117, Nov. 12, 1968, abandoned, which is a continuation of Ser. No. 688,373, Dec. 6, 1967, abandoned.

[52] U.S. Cl. ......... 260/302 H; 260/242; 260/247.1; 260/250 B; 260/268 BC; 260/270; 260/243.68; 260/294.8 C; 260/299; 424/200; 424/245; 424/270
[51] Int. Cl.² ..................................... C07D 277/30
[58] Field of Search ............................... 260/302 H

[56] References Cited
UNITED STATES PATENTS

| | | | |
|---|---|---|---|
| 2,500,131 | 3/1950 | Linsker | 260/279 |
| 2,518,130 | 8/1950 | Evans et al. | 260/250 |
| 3,017,415 | 1/1962 | Sarett et al. | 260/302 |
| 3,646,049 | 2/1972 | Hoff et al. | 260/302 |

OTHER PUBLICATIONS

Culvenor, *Revs. Pure App. Chem.,* Vol. 3 (1953), pp. 83–91.

*Primary Examiner*—R. Gallagher
*Attorney, Agent, or Firm*—David L. Rose; J. Jerome Behan; Frank M. Mahon

[57] ABSTRACT

Benzimidazoles characterized by having a 3-oxythiazol-2-yl or a 3-oxythiazol-4-yl substituent at the 2-position and which may be substituted further at the 1-, 5- and/or 6-positions are prepared by oxidation of the corresponding thiazol-2-yl or thiazol-4-yl benzimidazoles and are new compounds having significant anthelmintic and antifungal activity.

2 Claims, No Drawings

2-(3-OXYTHIAZOLYL)BENZIMIDAZOLES

CROSS REFERENCE TO RELATED APPLICATIONS

This application is a continuation of the application Ser. No. 224,357 filed Feb. 7, 1972, now abandoned, which is a continuation of application Ser. No. 20,092, filed Mar. 16, 1970, now abandoned, which in turn is a continuation in part of application Ser. No. 775,117, filed Nov. 12, 1968, now abandoned, which in turn is a continuation in part of application Ser. No. 688,373, filed Dec. 6, 1967, now abandoned.

This invention relates to new and useful compositions of matter classifiable in the field of organic chemistry as 2-(3-oxythiazolyl)benzimidazoles. More particularly, the instant invention relates to novel 2-(3-oxythiazolyl-4-yl) and 2-(3-oxythiazol-2-yl) benzimidazoles which compounds may be further substituted in the 1-, 5- and/or 6-positions; to methods of preparing these compounds; and to their use as anthelmintic and antifungal agents.

The novel 2-(3-oxythiazolyl)benzimidazoles provided in accordance with this invention are those having the following structural formula:

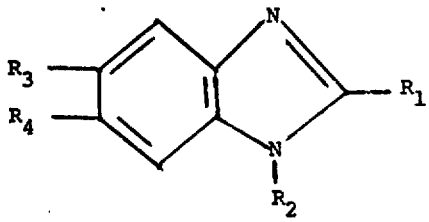

In the above formula, the symbol $R_1$ represents a 3-oxythiazol-4-yl or a 3-oxythiazol-2-yl group. The symbol $R_2$ in the above formula represents hydrogen, hydroxy; loweralkoxy such as methoxy, ethoxy and butoxy; loweralkyl such as methyl, ethyl and propyl; aralkyl such as benzyl; loweralkanoyl such as acetyl, propionyl and butyryl; loweralkanoyloxy such as formyloxy, acetyloxy and propionyloxy; carboxyloweralkoxy such as carboxy methoxy, carboxyethoxy and carboxy propoxy; carbamoyl such as N-methylcarbamoyl, N-ethylcarbamoyl and N-butylcarbamoyl; or an alkoxycarbonyl radical such as methoxycarbonyl, ethoxycarbonyl and isopropoxycarbonyl.

The symbols $R_3$ and $R_4$ in the foregoing formula represent hydrogen; loweralkyl such as methyl, ethyl, propyl isopropyl and butyl; lower alkoxy such as methoxy, isopropoxy and butoxy; aryl such as phenyl, tolyl, and naphthyl; aryloxy such as phenoxy, tolyloxy and naphthyloxy; loweralkylthio such as thioethyl, thiopropyl, and thiobutyl; arylthio such as thiophenyl, thiotolyl, and thionaphthyl; amino; loweralkylamino such as methylamino, propylamino and butylamino; diloweralkylamino such as dimethylamino, diethylamino and dipropylamino, nitro; halo; haloloweralkyl such as chloromethyl, 1,2-dichloroethyl, 3,3-dibromopropyl and trifluoromethyl; halophenyl such as p-fluorophenyl, o-chlorophenyl and m-bromophenyl; loweralkylphenyl such as p-methylphenyl, m-propylphenyl and o-ethylphenyl; loweralkoxyphenyl such as o-methoxyphenyl, m-isopropoxyphenyl and p-butoxyphenyl; loweralkylthiophenyl such as p-methylthiophenyl and m-ethylthiophenyl; loweralkylaminophenyl such as p-methylaminophenyl and o-ethylaminophenyl; diloweralkylaminophenyl such as p-dimethylaminophenyl, and m-dipropylamino phenyl; imidazolyl; isothiazolyl, furyl, pyrryl or

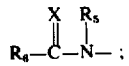

provided that only one of $R_3$ and $R_4$ can be

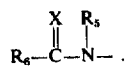

The symbol $R_5$ above represents hydrogen or a lower alkyl group such as methyl, ethyl, propyl, isopropyl, butyl, pentyl, and the like. The symbol X represents oxygen or sulfur.

The symbol $R_6$ above represents a loweralkoxy, haloloweralkoxy; loweralkylthio, haloloweralkylthio, aryloxy or a arylthio radical, in which case the substituents $R_3$ or $R_4$ are of the carbamate or thionocarbamate type depending upon the X substituent. The symbol $R_6$ may also represent hydrogen, loweralkyl, haloloweralkyl, cycloalkyl aryl, aralkyl, heteroaryl, loweralkylamino, diloweralkylamino or cycloalkylamino, in which case the substituents $R_3$ or $R_4$ are of the carbonylamino or thiocarbonylamino type depending upon the nature of the X substituent.

Specific examples of suitable substituents include those wherein $R_6$ is a loweralkoxy or haloloweralkoxy radical such as methoxy, ethoxy, isopropoxy, allyloxy, propenyloxy, 2,2,2-trifluoroethoxy, amyloxy, and n-octyloxy; those wherein $R_6$ is a loweralkylthio or haloloweralkylthio radical such as methylthio, ethylthio, 2-chloroethylthio, isopropylthio, allylthio and n-hexylthio; those wherein $R_6$ is aryloxy such as phenoxy, halophenoxy, aminophenoxy, tolyloxy, and naphthyloxy; and those wherein $R_6$ is arylthio such as phenylthio, halophenylthio, aminophenylthio, tolylthio and naphthylthio. As noted above, substituents of the foregoing type will afford carbamates or thionocarbamates.

Further specific illustrations of suitable substituents include those wherein $R_6$ is a loweralkyl or haloloweralkyl radical such as methyl, dichloromethyl, ethyl, isopropyl, allyl, t-butyl, amyl, and octyl; those wherein $R_6$ is cycloalkyl such as cyclopropyl, cyclopentyl, cyclohexyl and adamantyl; those wherein $R_6$ is aryl such as phenyl, halophenyl, aminophenyl, tolyl, and naphthyl; those wherein $R_6$ is aralkyl such as benzyl, halobenzyl, and phenethyl; those wherein $R_6$ is heteroaryl such as pyrryl, imidazolyl, thiazolyl, isothiazolyl, thiadiazolyl, pyrazinyl, furyl, thienyl and pyridyl, those wherein $R_6$ is a mono- or diloweralkylamino radical such as methylamino, diethylamino, isopropylamino, methylethylamino and n-hexylamino; and those wherein $R_6$ is cycloalkylamino such as piperazino, piperidino, morpholino and pyrrolidino. These substituents, as noted above, will afford carbonylamino or thiocarbonylamino groups.

As used in the foregoing description, the terms, loweralkyl, loweralkoxy, loweralkylthio, loweralkanoyl and loweralkanoyloxy, are intended to include straight or branched chain, saturated or unsaturated, loweralkyl, loweralkoxy, loweralkylthio, loweralkanoyl and loweralkanoyloxy groups wherein the alkyl, alkoxy alkanoyl or alkanoyloxy moiety contains from 1 to 8 carbon atoms. The term, halo, is intended to include halogen groups such as fluoro, chloro, bromo and iodo.

In those cases wherein $R_2$ is hydrogen, there may be formed acid addition salts with acids such as hydrochloric, sulfuric, nitric, phosphoric and hypophosphorous acid and with organic acids such as acetic, tertiarylbutylacetic, dialkylphosphoric, citric, benzoic, lactic and oxalic acid. Certain of these salts are more soluble than the parent base and for this reason are preferred when a soluble form of the product is desired for anthelmintic or antifungal use. This invention also contemplates the heavy metal complexes of the benzimidazole described above which are obtained by reacting the benzimidazole (where $R_2$ is hydrogen) with a salt of a heavy metal such as copper, lead, iron and mercury.

The instant invention is based upon applicants' discovery that the 2-(3-oxythiazolyl)benzimidazoles described above display significant anthelmintic activity. The anthelmintic activity of these compounds has been confirmed in vivo employing standard pharmacological techniques. It is contemplated that dosage units containing the 2-(3-oxythiazolyl)benzimidazoles of this invention as the essential active ingredient will be administered, both orally and by injection, in the treatment and control of helmintic infections in domestic animals such as sheep, cattle, horses, dogs, swine and goats.

Further, applicants have found that the 2-(3-oxythiazolyl)benzimidazoles of this invention display broad spectrum antifungal activity. It is contemplated, therefore, that antifungal compositions containing these compounds as an essential active ingredient will be employed in controlling the growth of fungi in or on animals and plants as well as in the paint, wood, textile, cosmetic, leather, tobacco, fur, rope, paper, pulb, plastics, fuel, rubber and food industries.

The novel 2-(3-oxythiazolyl)benzimidazoles of this invention are readily prepared by oxidation of the corresponding 2-(thiazolyl)benzimidazole with an organic peracid. Applicants have found that oxidation in this manner results in the selective oxidation of the thiazole nitrogen without involvement of the benzimidazole nitrogens or of amino substituents which may be present at other positions on the benzimidazole nucleus. It is preferred to employ a strong acidic peracid. In general, suitable peracids will be those derived from organic acids having a pKa less than 4.0. Typical peracids useful in this process will include trifluoroperacetic acid, dichloroperacetic acid, performic acid and nonopermaleic acids as the oxidizing agent. Trifluoroperacetic acid and dichloroperacetic acid are particularly preferred.

In general, the oxidation is carried out by treating the benzimidazole with a solution of the peracid at a temperature between about 75° to about 100°C. for a period of between about 1 to about 3 hours. Lower temperatures, i.e. room temperature, may be employed if desired with an increase in reaction time. When the reaction is complete, the cooled reaction mixture is poured into ice water and made slightly alkaline with aqueous base. The precipitated solids are separated by filtration and purified by conventional recrystallization techniques.

As indicated above, in order to prepare any of the 2-(3-oxythiazolyl)benzimidazoles of this invention it is necessary merely to select the corresponding 2-thiazolyl)benzimidazole as the starting material. 2-(Thiazolyl)benzimidazoles wherein $R_1$ and $R_2$ are as defined above and wherein $R_3$ are as defined above and $R_4$ are as defined above, with the exception of the carbamate, thionocarbamate, carbonylamino and thiocarbonylamino species, are compounds well-known in the art and are either available commercially or may be prepared by methods already fully described in the chemical and patent literature. Those 2-(thiazolyl)benzimidazoles wherein the $R_3$ or $R_4$ substituent are of the carbamate, thionocarbamate, carbonylamino or thiocarbonylamino type, i.e. those compounds wherein the $R_3$ or $R_4$ substituent is

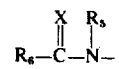

have been more recently described in Belgian Patent No. 701,048 published July 30, 1968 wherein their preparation is fully described.

Although any of the 2-(3-oxythiazolyl)benzimidazoles of this invention may be prepared by the direct oxidation technique described above, a preferred technique, from the standpoint of yield, for the preparation of 2-(3-oxythiazolyl)benzimidazoles wherein the substituent at $R_3$ or $R_4$ is amino, involves the hydrolysis of a 2-(3-oxythiazolyl)benzimidazole wherein the $R_3$ or $R_4$ substituent is of the carbamate, thionocarbamate, carbonylamino or thiocarbonylamino type. The hydrolysis preferably is carried out by treating the benzimidazole with concentrated inorganic acid such as hydrochloric acid, sulfuric acid, hydrobromic acid and nitric acid. The reaction may be run at temperatures ranging from about room temperature to about 100°C. and may be carried out in the presence of an acidic solvent such as acetic acid. After completion of the hydrolysis, the reaction mixture is made basic with an aqueous inorganic base such as sodium hydroxide and ammonium hydroxide and the precipitated product is recovered by filtration and purified by conventional recrystallization.

2-(3-Oxythiazolyl)benzimidazoles of this invention wherein the substituent at $R_3$ or $R_4$ is amino are useful intermediates in the synthesis of other 2-(3-oxythiazolyl)benzimidazoles of this invention, particularly those benzimidazoles wherein the $R_3$ or $R_4$ substituent is of the carbamate, thionocarbamate, carbonylamino or thiocarbonylamino type. In Belgian Patent No. 701,048 there is described the preparation of carbamate, thionocarbomate, carbonylamino and thionocarbonylamino substituted benzimidazoles from the amino substituted benzimidazole. By employing the techniques there described in full, the amino-2-(3-oxythiazolyl)benzimidazole species of this invention similarly may be used as intermediates in the preparation of carbamate, thiocarbamate, carbonylamino and thiocarbonylamino 2-(3-oxythiarolyl)benzimidazoles, thus affording an alternate route to the synthesis of these novel and valuable compounds.

When used as an anthelmintic agents for the treatment and/or prevention of helminthiasis, the novel 2-(3-oxythiazolyl)benzimidazoles of this invention may be administered orally in a unit dosage form such as a capsule, bolus, tablet or as a liquid drench. They may also be administered orally by intimately dispersing them in an animal feedstuff or by using them as a top dressing or in the form of pellets which are added to a finished feed. Alternatively, they may be administered to animals in a liquid carrier vehicle by intraruminal, intramuscular and intratracheal injection. The quantity of active material required to give best anthelmintic response will depend upon the particular benzimidazole employed, the species of animal to be treated and the type and severity of helminth infection. Good results are usually obtained when there is administered a total dose of from about 5 to about 125 mg. of active benzimidazole per kg. of animal body weight. Such total dose may be given at one time or in divided doses over a short period of time such as 1–2 days.

When used an antifungal agents, the 2-(3-oxythiazolyl)benzimidazoles of this invention may be incorporated into diverse formulations solid, including finely divided powders and granular materials, as well as liquid, such as solutions, emulsions, suspensions, concentrates, emulsifiable concentrates, slurries and the like, depending upon the application intended and the formulation media desired. Thus it will be appreciated that the compounds of this invention may be employed to form fungicidally active compositions containing a fungicidally active quantity of such compounds as an essential active ingredient. Such compositions may also contain finely divided dry or liquid diluents, extenders, fillers, conditioners and excipients including various clays, diatomaceous earth, talc, and the like, or water and various organic liquids such as lower alkanols, such as ethanol and isopropanol, or kerosene, benzene, toluene and other petroleum distillate fractions or mixtures thereof.

The best mode contemplated by applicants for carrying out their invention is set forth in the following illustrative examples. No limitation, however, is intended except as set forth in the appended claims.

EXAMPLE 1

2-(3-Oxythiazol-4-yl)benzimidazole

To a solution of trifluoroperacetic acid, prepared by adding 77.0 ml. of thirty percent hydrogen peroxide dropwise to 400 ml. of trifluoroacetic acid at room temperature, is added 100 gm. of 2-(thiazol-4-yl)benzimidazole in one portion. The reaction mixture is heated at 85° – 90° for 1.5 hours. After cooling, the solution is poured into 6 liters of ice water. The resultant solution is basified to pH 8 by addition of concentrated ammonium hydroxide. The solids are collected by filtration and washed with water. The crude product is dissolved in a refluxing methanol, treated with charcoal, filtered, and allowed to stand at room temperature overnight. Filtration of the precipitated solids yields purified 2-(3-oxythiazol-4-yl)benzimidazole. (M.P. 229°–230°C. dec.)

EXAMPLE 2

2-(3-Oxythiazol-2-yl)benzimidazole 2-(Thiazol-2-yl)benzimidazole, 0.503 gm., is treated with a solution of trifluoroperacetic acid prepared from 0.40 ml. of 30% hydrogen peroxide in 2.0 ml. of trifluoroacetic acid in the same manner as in Example 1. The crude product, after isolation is recrystallized from methanol to yield pure 2-(3-oxythiazol-2-yl)benzimidazole. (M.P. 266°–268°C. dec.)

EXAMPLE 3

5-Isopropoxycarbonylamino-2-(3-oxythiazol-4-yl)benzimidazole

To a solution of dichloroperacetic acid, prepared by adding 34 ml. of 30 percent hydrogen peroxide to 500 ml. of dichloroacetic acid at room temperature, one adds 45 gm. of 5-isopropoxycarbonylamino-2-(thiazol-4-yl)benzimidazole in one portion. The mixture is heated for 2 hours at 85°–90°C. The cooled reaction mixture is poured into 1 l. of ice water and basified with concentrated ammonium hydroxide. The resultant mixture is stirred at room temperature for 2 hours and the supernatent liquid is removed by decantation. After washing with water, the gummy residue is taken up in hot methanol, treated with charcoal and filtered. Approximately one-half of the methanol is removed by distillation and the cooled solution is stirred at room temperature overnight. The precipitated solids are collected by filtration, washed with cold methanol and dried in vacuo. The impure 5-isopropoxycarbonylamino-2-(3-oxythiazol-4-yl)benzimidazole is partially purified by recrystallization from methanol. Final purification can be achieved by passing the purified product, dissolved in a 10% methanol 90% chloroform mixture, over 270 gm. of silica gel. (M.P. 248°–250°C.)

EXAMPLE 4

5-Benzoylamino-2-(3-oxythiazol-4-yl)benzimidazole

To a solution of dichloroperacetic acid prepared by adding 3.4 ml. of thirty percent hydrogen peroxide to 40 ml. of dichloroacetic acid, one adds 4.8 gm. of 5-benzoylamino-2-(thiazol-4-yl)benzimidazole in one portion. The reaction mixture is heated at 85°–90°C. for 1.5 hours. The cooled mixture is poured into 150 ml. of ice water with stirring and basified with concentrated ammonium hydroxide. After stirring at 0°–5°C. until solidification is complete, the solids are collected by filtration and washed with water. After drying, recrystallization from methanol yields partially purified 5-benzoylamino-2-(3-oxythiazol-4-yl)benzimidazole. Final purification is obtained by passing a solution of the N-oxide in 10% methanol-90% chloroform mixture over silica gel and elution with the same solvent. (M.P. 231°–233°C. dec.)

EXAMPLE 5

5-p-Fluorobenzoylamino-2-(3-oxythiazol-4-yl)benzimidazole

Treatment of 5.07 g. of 5-p-fluorobenzoylamino-2-(thiazol-4-yl)benzimidazole with dichloroperacetic acid in the same manner as above yields 5-p-fluorobenzoylamino-2-(3-oxythiazol-4-yl)benzimidazole. (M.P. 236°–237°C. dec.)

EXAMPLE 6

5-Methoxycarbonylamino-2-(3-oxythiazol-4-yl)benzimidazole

Following the procedure of Example 3 above and substituting an equivalent molar quantity of 5-methoxycarbonylamino-2-(thiazol-4-yl)benzimidazole for the 5-isopropoxycarbonylamino-2-(thiazol-4-yl)benzimidazole, there is obtained 5-methoxycarbonylamino-2-(3-oxythiazol-4-yl)benzimidazole. (M.P. 238°–240°C. dec.)

EXAMPLE 7

5-Butoxycarbonylamino-2-(3-oxythiazol-4-yl)benzimidazole

Treatment of an equivalent molar quantity of 5-butoxycarbonylamino-2-(thiazol-4-yl)benzimidazole with dichloroperacetic acid in the same manner as in Example 3 above yields 5-butoxycarbonylamino-2-(3-oxythiazol-4-yl)benzimidazole. (M.P. 230°–233°C. dec.)

EXAMPLE 8

5-Ethoxycarbonylamino-2-(3-oxythiazol-4-yl)benzimidazole

Following the procedure of Example 3 above and substituting an equivalent molar quantity of 5-ethoxycarbonylamino-2-(thiazol-4-yl)benzimidazole for the 5-isopropoxycarbonylamino-2-(thiazol-4-yl)benzimidazole, there is obtained 5-ethoxycarbonylamino-2-(3-oxythiazol-4-yl)benzimidazole.

Employing the techniques described in any of Examples 1–4 above and substituting an equivalent molar quantity of an appropriately substituted 2-(thiazolyl)-benzimidazole as the starting material, any of the 2-(3-oxythiazolyl)benzimidazoles of this invention may be prepared.

EXAMPLE 9

2-(3-Oxythiazol-4-yl)benzimidazole Monohydrochloride

Five grams of 2-(3-oxythiazol-4-yl)benzimidazole is added with stirring to 1000 ml. of ethanol saturated with dry hydrogen chloride. An additional 125.0 ml. of ethanol is added. The solution is treated with 5.0 gm. of activated charcoal and the charcoal is removed by filtration. The resulting clear solution is diluted with three times its volume of ethyl ether and the resulting mixture is chilled. The precipitated product is recovered by filtration to yield 2-(3-oxythiazol-4-yl)benzimidazole monohydrochloride.

EXAMPLE 10

2-(3-Oxythiazol-2-yl)benzimidazole Sulfate

Fifty milligrams of 2-(3-oxythiazol-2-yl)benzimidazole in 5.0 ml. of ethanol is treated with 3 drops of 50% sulfuric acid. Dilution of the mixture to turbidity with ethyl ether and cooling yields 2-(3-oxythiazol-2-yl)benzimidazole sulfate.

Any of the 2-(3-oxythiazolyl)benzimidazoles of this invention wherein the $R_2$ substituent is hydrogen may be converted into the corresponding acid addition salt by the techniques described in Examples 9 and 10 above. Where desired, solids other than those specifically illustrated such as, for example, phosphoric hypophosphorous, acetic, tetiarybutylacetic, dialkylphosphoric, citric, benzoic, lactic, oxalic, and the like acids, may be employed to form the acid addition salt.

EXAMPLE 11

Cobalt Chloride-2-(3-Oxythiazol-4-yl)benzimidazole Complex

One-half gram of cobaltous chloride hexahydrate is added to 2.0 gm. of 2-(3oxythiazol-4-yl)benzimidazole in 5.0 ml. of dimethyl acetamide. Benzene (20.0 ml.) is added to the resulting solution and the mixture is cooled giving cobalt chloride-2-(3-oxythiazol-4-yl)benzimidazole complex.

EXAMPLE 12

Iron Sulfate-2-(3-Oxythiazol-4-yl)benzimidazole Complex 2-(3-Oxythiazol-4-yl)benzimidazole (0.2 mole) and ferrous sulfate (0.3 mole) are admixed and 130 ml. of water are added thereto. The mixture is refluxed for 2.0 hours. The resulting suspension is cooled, filtered and the iron sulfate-2-(3-oxythiazol-4-yl)benzimidazole complex formed is washed with water and dried in vacuo.

Any of the 2-(3-oxythiazolyl)benzimidazoles of this invention may be converted into the corresponding heavy metal salt-2-(3-oxythiazolyl)benzimidazole complex by employing the techniques of Examples 11 and 12 above. Heavy metal salts other than those specifically illustrated may be employed in the formation of complexes. Heavy metal salts useful in preparing complexes are comprised of an anion and a metal such as copper, lead, zinc, iron cobalt, nickel, chromium, manganese, cadmium, molybdenum, tungsten and tin. The anion moiety of the heavy metal salt is not and may vary widely. Typical anions will include, for example, halides such as fluoroide, bromide, chloride and iodide, nitrate; barate; sulfate; carbonate; stannate; phosphate; nitrite; thiocyanate; perchlorate; permanganate; arsenate; stilbinate; and carboxylic acid anions such as acetate, propionate, benzoate and the like.

EXAMPLE 13

5-Amino-2-(3-oxythiazol-4-yl)benzimidazole

One gram of 5-isopropoxycarbonylamino-2-(3-oxythiazol-4-yl)benzimidazole is suspended in 10.0 ml. of 32% hydrogen bromide in acetic acid and heated on a steam bath for 1.0 hours. After cooling, the mixture is diluted with 30.0 ml. of water and basified with concentrated ammonium hydroxide. The precipitate is collected by filtration, washed with water and dried in vacuo. Recrystallization from methanol yields purified 5-amino-2-(3-oxythiazol-4-yl)benzimidazole. (M.P. above 340°C.)

EXAMPLE 14

5-Amino-2-(3-oxythiazol-2-yl)benzimidazole

One gram of 5-methoxythiocarbonylamino-2-(3-oxythiazol-2-yl)benzimidazole is suspended in 20.0 ml. of concentrated sulfuric acid and stirred at room temperature for 3.0 hours. The reaction mixture is then diluted with 75.0 ml. of water and basified with sodium hydroxide. The precipitate is separated by filtration, washed with water and dried in vacuo. The crude 5-amino-2-(3-oxythiazol-2-yl)benzimidazole is purified by recrystallization from hexane.

Employing the techniques of Examples 13 and 14 above, any of the 2-(3-oxythiazolyl)benzimidazoles of this invention having a carbamate, thionocarbamate, carbonylamino or thiocarbonylamino group as the $R_3$ or $R_4$ substituent may be subjected to hydrolysis to obtain the corresponding amino compound. Concentrated inorganic acids other than hydrobromic and sulfuric acid (i.e. hydrochloric and nitric acid, for example) may be employed, if desired.

The following Examples illustrate the use of 5-amino-2-(3-oxythiazolyl)benzimidazoles as intermediates in

EXAMPLE 15

5-Isopropoxycarbonylamino-2-(3-oxythiazol-4-yl)benzimidazole 2.6 G. of isopropyl chloroformate is added dropwise to a mixture of 4.32 g. of 5-amino-2-(3-oxythiazol-4-yl)benzimidazole in 20 ml. of dry pyridine, the addition being carried out at room temperature. The mixture is stirred at room temperature for 90 minutes and then about 200 ml. of ice water is added. The resulting solid is collected by filtration and washed with water. It is dissolved in a minimum volume of methanol and the methanol solution is treated with decolorizing charcoal. The charcoal is filtered off and the clear solution is evaporated to a small volume. A small volume of water is added to induce crystallization. The solid 5-isopropoxycarbonylamino-2-(3-oxythiazol-4-yl)benzimidazole is separated by filtration and dried.

EXAMPLE 16

5-Benzoylamino-2-(3-oxythiazol-4-yl)benzimidazole

To a mixture of 4.32 g. of 5-amino-2-(3-oxythiazol-4-yl)benzimidazole and 20 ml. of pyridine, there is added dropwise 2.81 g. of benzoyl chloride. The reaction mixture is stirred for one hour at room temperature and water is then added to the point of cloudiness. The mixture is chilled and the solid product is recovered and purified by recrystallization from methanol.

EXAMPLE 17

5-p-Fluorobenzoylamino-2-(3-oxythiazol-4-yl)benzimidazole

When the procedure of Example 16 is repeated using 3.17 g. of p-fluorobenzoyl chloride in place of benzoyl chloride, there is obtained 5-p-fluorobenzoylamino-2-(3-oxythiazol-4-yl)benzimidazole.

EXAMPLE 18

5-Methoxycarbonylamino-2-(3oxythiazol-4-yl)benzimidazole

One gram of 5-amino-2-(3-oxythiazol-4-yl)benzimidazole is suspended in 25.0 ml. of water and treated dropwise with 0.37 ml. of methylchloroformate. The reaction mixture is stirred at room temperature for 1.0 hours. After being made basic with concentrated ammonium hydroxide, the reaction mixture is filtered and the solids are washed with water. Recrystallization from methanol yields purified 5-methoxycarbonylamino-2-(3-oxythiazol-4-yl)benzimidazole.

EXAMPLE 19

5-n-Butoxycarbonylamino-2-(3-oxythiazol-4-yl)benzimidazole

From the reaction of 1.8 gm. of 5-amino-2-(3-oxythiazol-4-yl)benzimidazole in 45 ml. of water and 1.16 gm. of n-butylchloroformate in the same manner as in Example 18, there is obtained 5-n-butoxycarbonylamino-2-(3-oxythiazol-4-yl)benzimidazole.

It should be understood that although this invention has been described with reference to particular embodiments thereof, changes and modifications will suggest themselves to those skilled in the art from a study of the foregoing description. Applicants consider all such changes and modifications to be the full equivalent of the embodiments specifically disclosed and to fall within the intended scope of their invention.

The subject matter which applicants consider to be their invention is particularly pointed out and distinctly claimed as follows:

What is claimed is:
1. 2-(3-Oxythiazol-4-yl)benzimidazole.
2. 5-Isopropoxycarbonylamino-2-(3-oxythiazol-4-yl)benzimidazole.

* * * * *